Inventor
H. H. ADELAAR-F. CLEMENS-
J. L. MASURE
By
Paul W. Hemminger
Agent

Inventor
H.H. ADELAAR-F. CLEMENS-
J.L. MASURE
By [signature]
Agent

June 1, 1965

H. H. ADELAAR ETAL 3,187,099

MASTER-SLAVE MEMORY CONTROLLED SWITCHING AMONG A PLURALITY OF TDM HIGHWAYS

Filed Dec. 7, 1960

3 Sheets-Sheet 3

Inventor
H. H. ADELAAR-F. CLEMENS-
J. L. MASURE
By [signature]
Agent

United States Patent Office 3,187,099
Patented June 1, 1965

3,187,099

MASTER-SLAVE MEMORY CONTROLLED SWITCHING AMONG A PLURALITY OF TDM HIGHWAYS

Hans Helmut Adelaar, Frans Clemens, and Jean Louis Masure, Antwerp, Belgium, assignors to International Standard Electric Corporation, New York, N.Y., a corporation of Delaware Filed Dec. 7, 1960, Ser. No. 74,434
Claims priority, application Belgium, July 28, 1960, 39,938, Patent 593,489
5 Claims. (Cl. 179—15)

The invention relates to a control system for a communication network comprising a plurality of time division multiplex highways which serve corresponding groups of circuits between which connections must be established. Information storage devices or slave control equipments are associated with each of said multiplex highways and each stores information relating to connections established by sampling in accordance with the time divison multiplex principle between the said circuits served by the corresponding multiplex highways. This system includes means for handling the establishment, routing, supervision and disconnection of communications.

Such a system is already known and for a detailed description one may refer for instance to the U.S. Patent No. 2,910,540, issued October 27, 1959 to S. Van Mierlo et al. In a communication system adapted for instance to serve as a large capacity telephone exchange, one may then particularly use the arrangement described in the U.S. patent application of H. H. Adelaar, Serial No. 63,203, filed October 17, 1960. In this system, the junction diagram particularly provides for the division of the subscribers in groups, each of which being served by a multiplex highway. The multiplex highways are grouped in supergroups (of subscribers) by means of intermediate multiplex highways which permits communications between subscribers served by highways comprised in the same supergroup, or between subscribers pertaining to two distinct supergroups. Such a system possesses various advantages in that it considerably simplifies the problem of the interconnection of multiplex highways serving the various subscribers' groups.

Such a system, and in fact any communication system using the time division multiplex principle, necessitates a control equipment associated with each highway, and since these must co-operate for the establishment of the communications, a control equipment common for the whole of the system must also be provided. Each of these equipments is preferably constituted by a sequential access memory, eventually an access selector, or any other means fulfilling this function, in accordance with the nature of the memory, and a logical equipment having the task of processing the information pulled out of the memory, to control ensuing operations, or to prepare information to be recorded in the memory in the place of the preceding information. The memories associated with the multiplex highways, which may be called slave memories, comprise as many compartments as the multiplex highways comprise channels. Each of these compartments contains the information relative to the communication established by means of the corresponding channel. They are scanned cyclically at the relatively rapid rhythm with which the sampling of the signals to be transmitted must be realized. For instance, for a sampling frequency of 10 kc./s. and for multiplex links using 25 time channels, one reaches a frequency of 250 kc./s., which is the rhythm at which one moves from one channel or from one corresponding compartment, to the next.

In so far as the common control equipment or master equipment is concerned, its elements are not necessarily tied to such a scanning rhythm. A control circuit for the establishment of communications such as a register for instance, must be able to have access to a given subscriber at a rhythm which is sufficiently fast to detect current interruptions in the subscriber's loop produced by the calling dial. A common supervision equipment for the existing communications must also have access to the slave elements controlling these various communications, at a given rhythm. In all cases, these rhythms of operation of the master control equipments are notably less high than the control rhythm of the slave equipments for the multiplex highways and determined by the sampling frequency and the number of the channels on these highways.

A general object of the invention is to enable in a systematic manner all the master control equipments to operate at working rhythms which are notably less high than those imposed on the equipments directly serving the multiplex highways.

Another object of the invention is to facilitate the association between the said master control equipments and the said slave control equipments while avoiding undesirable delays in the transmissions between these two types of equipments.

In accordance with the main characteristic of the invention a control system as defined at the beginning of the description is characterized by the fact that the information coming from the said master control equipment is made available or is offered to the slave control equipments for said multiplex highways during a time interval which is at least equal to the sampling period of said multiplex highways.

In accordance with another characteristic of the invention, the said information stored by the master control equipment is brought by the latter into a staticizing device comprising for instance a plurality of bistate or binary devices, the information staying at the disposal of said slave equipments in this staticizing device during the said sampling period, after which it is retransmitted, after eventual modification, to the said master equipment.

In accordance with yet another characteristic of the invention, the said master equipment is constituted by one or more sequential access storage devices, permitting to regularly bring each word of the said storage device into the said staticizing device during a time interval which is at least equal to said sampling period and at the storage device own rhythm.

In accordance with yet another characteristic of the invention, the number of compartments of the memories associated with the master control equipments is calculated in function of the traffic.

In accordance with yet another characteristic of the invention, the information transmitted from the said staticizing device of the master control equipment toward the staticizing devices of the slave control equipments, are automatically and regularly substituted to the information stored in the slave control equipments.

In this manner, it is seen that there is no particular relationship between the cycle of the sequential access memories part of the master control equipment and that of the memories part of the control devices serving the multiplex highways, except that the staticizing time from the master memories must at least be equal to the sampling period. On the other hand, with the positive control exerted by the master control equipment on the slave control equipments, any temporary error on behalf of the slave control equipment will be immediately corrected after a very short time depending on the rhythm of circulation of the information in the master control equipment.

It is to be remarked that it is already known from the pending U.S. patent application of E. Wright et al., Serial No. 34,452 filed June 7, 1960 to realize a control system for a communication network of the type envisaged in the present invention, control system which comprises a master equipment and slave equipments for the multiplex highways. The present invention differs however from this prior system; particularly in that, in this prior system, the staticizing time for the words stored in the master memory does not reach the sampling period.

The use of a staticizing time at least equal to the sampling period offers the advantage of constituting a direct and undelayed information transfer between the master memory or memories and the slave memories. Moreover, logical operations which must be accomplished by the master control equipment may be realized at a speed which is not intimately tied to the product of the sampling frequency by the number of channels used on the multiplex highways. In principle, from the moment that the staticizing time is at least equal to $$\frac{n+1}{n}$$

times the sampling period, $n$ representing the number of channels on the multiplex highways, it is not necessary to have synchronization between the channel pulses and the pulses controlling the sequential access storage device(s). Moreover, the staticizing time at least equal to a sampling period can be used with advantage for carrying out any desired logical operation on the temporarily staticized information before these are returned into the master sequential access storage device.

Yet another object of the invention is to realize a transfer of information between the master control equipment and the slave control equipments which is particularly simple and efficient.

In accordance with yet another characteristic of the invention, the control system comprises slave control equipments associated with the multiplex highways which are constituted by sequential access storage devices adapted to record informaiton relative to the circuits which have to be associated during time channels or time slots of said multiplex highways, as well as by associated staticizing means to staticize the corresponding information during each channel time, selection means being provided to permit the selective association of said staticizing devices of the master control equipments with the said staticizing devices of one or more of the slave control equipments serving said multiplex highways, and gating means controlled by the identity of a channel stored in said staticizing means of the master control equipment to transfer information towards the staticizing device or devices of the selected slave control equipments, during the said time channel whose identity is recorded in the master control equipment.

According to yet another characteristic of the invention, a counting device having at least $n$ distinct states, $n$ representing the number of channels, is arranged to be permanently fed by a pulse source whose frequency is equal to $n$ times the sampling frequency in such a way that said counting device regularly passes through these $n$ distinct states during each sampling period, means being provided to compare the code identifying a channel recorded in one of the said staticizing devices of the master control equipment with the code defined by the state of said counter in such a manner that the comparator produces a pulse during the channel where there is coincidence between the two codes, this pulse being switched by the said selecting means toward the staticizing device or devices of the slave control equipments identified in the staticizing device of the master control equipment, so as to control the unblocking of gates permitting the transfer of information stored in said staticizing device of the master control equipment toward the staticizing device or devices of the slave control equipment.

The counting device going regularly through $n$ distinct states during each sampling period may be part of the central control pulse generating system and the code used will advantageously be the same as that used to identify the channel in the master memory or memories. The comparator thus serves to translate the code identifying the channel temporarily stored in the master staticizing device into a pulse occupying the time position characterizing this channel. By switching this pulse toward the chosen selective memory and whose identity is recorded in the staticizing device of the master memory, one may then offer the information to be transmitted to this selective memory in parallel to all the slave memories since this information will only be able to reach the slave memory selected by an unblocking operation of electronic gates controlled by the channel pulse produced by the comparator. Such a system offers the considerable advantage that it reduces the transmission of control information at high frequency to the strict minimum, since there is only a single wire having to allow a channel pulse between the master staticizing device and a given slave memory. Thus, it will only be for this limited number of control wires that it will be necessary to foresee the precautions which must in general be taken upon the transmission of relatively high frequency signals.

Yet, another object of the invention is to simplify the means necessary for the transfer of information between the master control equipment and the slave control equipments.

In accordance with yet another characteristic of the invention, the transfer of information from the master control equipment is performed, for a given staticized period of the information coming from the master memory, toward the slave control equipment serving a particular multiplex highway.

In this manner, it is not necessary to provide more than one access equipment toward the different slave memories from the master control equipment, and it is also not necessary to foresee more than one access equipment which, as described above, permits to send a pulse in a particular time channel toward the slave memory or memories serving a multiplex highway.

In accordance with yet another characteristic of the invention, the master control equipment is arranged for recording control information for the operations to be performed, in such a way that this control information is transferred into the staticizing device associated with the master control equipment, this operations controlling information being able to be modified during the staticizing time in such a manner that a new control information is sent back to the master memory, associated with the other information, to re-appear at the next staticizing time allotted to this information.

In this manner, during a staticizing time for a given information relative to a given communication either in the process of being established, or established, or in the course of being interrupted, one may transmit a certain part of this information toward a particular slave control equipment, while during the next staticizing time allotted to the same information, a different control information will be able to give rise to a transfer of another part of the staticized information toward another slave control equipment associated to another multiplex highway.

The above and other objects and characteristics of the invention and the invention itself will appear more clearly from the following detailed description of a preferred embodiment of the invention to be read in conjunction with the accompanying drawings in which.

Figure 1:
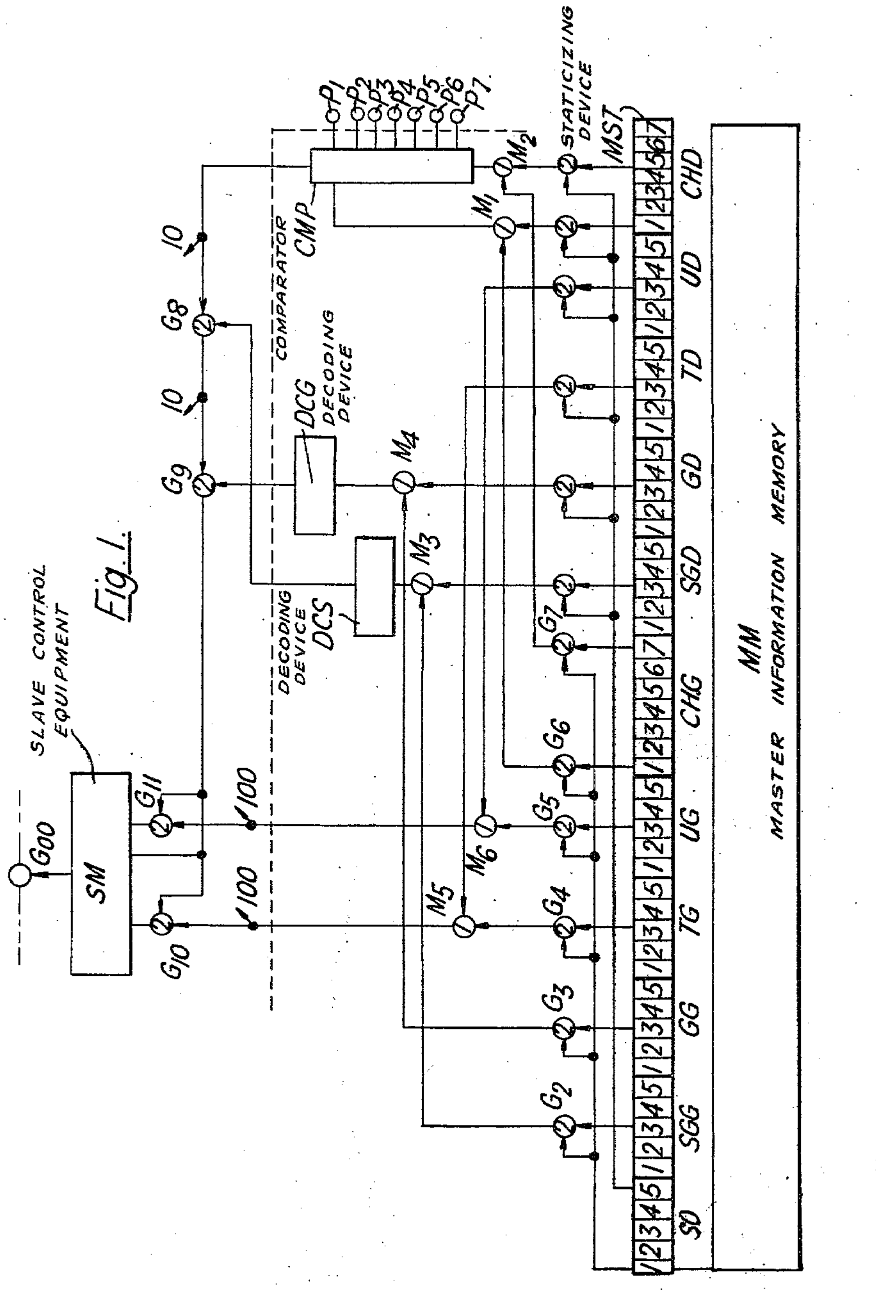
FIG. 1 shows a schematic diagram of a control system for a communication network using the time division multiplex principle and comprising a master control equipment and slave control equipments associated with one another in accordance with the invention.

By referring to FIG. 1, the latter represents a control system for a communication network such as a 10,000 line telephone exchange for instance, this telephone exchange operating in accordance with the time division multiplex principle. In accordance with this principle, a plurality of multiplex highways is foreseen, which highways may each be constituted by a coaxial cable and serve for instance a group of 100 subscribers. Electronic gates are foreseen between each multiplex highway and the line circuits of the subscribers which it serves, as well as between the various multiplex highways. In this manner, for instance the simultaneous unblocking of gates interconnects two subscribers. A communication can thus be established in a given time slot on the basis of sampling at a frequency of 10 kc./s. for instance and preferably in accordance with the principle of resonant transfer circuits permitting bidirectional communications, such as described for instance in the U.S. patent application of K. Cattermole et al., Serial No. 663,704, filed June 5, 1957, now Pat. No. 3,073,903. On each multiplex highway the other time slots may be used to achieve simultaneous communications between other subscribers, and consequently a control equipment must be associated to each multiplex highway. It will have as a main function to memorize the sets of gates associated to this multiplex highway and having to be unblocked during a particular time slot. Such a control equipment serving a multiplex highway is indicated by SM in FIG. 1, a bidirectional electronic gate $G_{00}$ being represented as controlled by the equipment SM, this gate $G_{00}$ being for instance a gate interconnecting the line circuit of a subscriber (not shown) with the multiplex highway serving this subscriber (not shown). FIG. 1 also shows a master control equipment which essentially comprises a master information memory MM associated with a staticizing device MST which regularly extracts, at a given rhythm and in turn, all the information contained in the master memory MM. Such a sequential access memory provided with a staticizing device is well known. In particular, it will be possible to realize the memory MM by means of an information storage matrix, e.g. a matrix using magnetic elements able to stand in two distinct states corresponding to a hysteresis characteristic which is substantially rectangular, the memory comprising a certain number of rows and a certain number of columns. Each of these rows may serve for the recording of a word, i.e. a series of binary bits which characterises the information pertaining to a given communication. The number of columns of such a memory is then determined by the number of binary digits of each word. With the help of an access selector which has not been represented in FIG. 1 as it is assumed it is an integral part of the memory MM, one may successively select in time, at a given rhythm, the different rows of the memory, this selection being materialized by the presence or by the absence of pulses on column wires going towards the staticizing device MST. The latter essentially comprises a number of binary or bistate devices such as bistable flip-flops, the number of these flip-flops being equal to the number of columns. After the staticizing time interval of a particular word, this word which may have been modified during the staticizing time, is then reinscribed in the memory MM by using the principle of the half pulses, a half pulse being applied with the help of the access selector to the row wherein the word must be reinscribed, and the other half pulses being selectively applied to column wires in accordance with the state of the bistable devices associated to these columns. Such sequential memories are well known and for this reason FIG. 1 schematically shows a wire connecting the first bistable device $SO_1$ of MST to MM, as well as a second wire connecting the last bistable device $CHD_7$ of MST to MM. Similar connections are of course provided between the other bistable devices and the memory MM and different reading and rewriting wires may be foreseen.

The stabilizing device MST has been represented in FIG. 1 as comprising a total of 59 bistable devices represented by rectangles. This number is of course, given by way of example and depends from the control information to be stored and periodically staticized.

Figure 2:
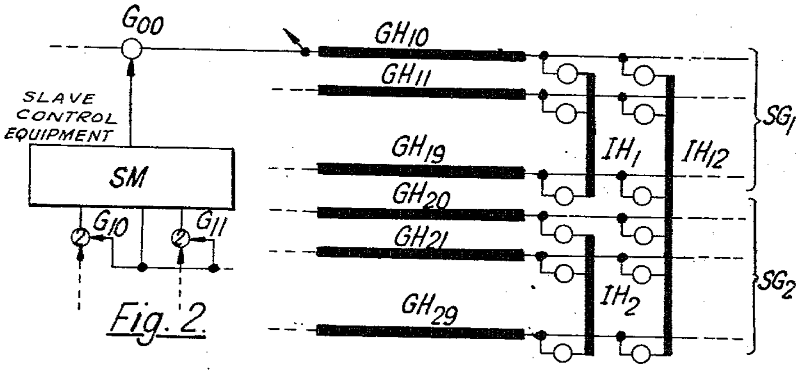
FIG. 2 shows a simplified junction diagram of a communication system to which the control system of FIG. 1 may be applied.

Before detailing the various control informations which are stored in MST, one will briefly describe with the help of FIG. 2 the principle of a time division multiplex telephone system to which the system of FIG. 1 may be applied.

FIG. 2 shows in a simplified manner the junction diagram of the system described in the U.S. patent application of H. Adelaar, Serial No. 63,203 filed October 17, 1960. As shown by FIG. 2, the slave control equipment SM controls a series of electronic gates such as $G_{00}$ which may number a hundred and each of which given access to the line circuit (not shown) of a telephone subscriber. On the exchange side these 100 gates are connected in parallel as indicated by the arrow, towards a multiplex highway $GH_{10}$. For a 10,000 line exchange one may in principle, foresee 100 multiplex highways such as $GH_{10}$. In order to render practicable the realisation of the interconnection of these various multiplex highways, these various highways each serving a group of subscribers are associated as supergroups (of subscribers) such as $SG_1$ each comprising 10 multiplex highways such as $GH_{10/19}$ of which only the first two and the last have been represented in FIG. 2. Likewise, the second supergroup $SG_2$ comprises the 10 multiplex highways $GH_{20/29}$, the other supergroups being analogous and not represented in the figure. For each supergroup there exists an intermediate multiplex highway such as $IH_1$ to which are connected 10 gates each associated with one of the multiplex highways of the supergroup. Such an intermediate multiplex highway $IH_2$ is also shown to be provided for supergroup $SG_2$. Likewise, intermediate multiplex highways such as $IH_{12}$ are also provided in association with 20 electronic gates in order to be able to interconnect any multiplex highway of a supergroup with any multiplex highway of another supergroup, while the highways such as $IH_1$ serve to interconnect two multiplex highways pertaining to the same supergroup. This system of intermediate interconnections is described in more detail in the U.S. patent application of H. Adelaar, Serial No. 55,631, filed September 13, 1960, now Patent No. 3,132,210. Other intermediate multiplex highways may also be provided as described in the first patent application mentioned above, in particular one or more intermediate multiplex highways of which each has on the one hand access to the 100 multiplex highways serving a group of subscribers by means of 100 electronic gates. On the other hand, this intermediate multiplex highway is connected to a series of storage devices for sampled speech pulses in such a way that this common intermediate multiplex highway permits to realize intragroup communications between subscribers connected to the same multiplex highway, by using two time slots, one to go from one subscriber towards a storage device and the other to communicate between this device and the other subscriber, this contrary to the other communications which in accordance with the principle of the noted U.S. Patent No. 2,910,540 use the same time slot for all the multiplex links connected in cascade for the establishment of a given communication.

In such a system, the common control equipment will thus be brought to record information characterizing the identity of the calling line, the identity of the called line and more particularly their physical position in the network, and the time slots, which may be the same for the intergroup communication but which will be different for the intragroup communication, used on the multiplex highways of the calling and called subscribers. Other information may yet be recorded in the master control equipment, and in particular control orders or sequence orders which will permit to authorize or not the transfer of some of the information during the staticizing time.

The first five bistable devices $SO_{1/5}$ of MST in FIG. 1 have been foreseen to store such orders. To each bistable device such as $SO_1$ may correspond a given order, but from these bistable devices one may of course, characterize a larger number of orders by using appropriate codes. For instance, by paired combinations, the bistable devices $SO_{1/5}$ may be made to characterize ten distinct instructions. The bistable devices $SGG_{1/5}$ are used to characterize the identity of the supergroup to which the calling subscriber pertains, i.e. the thousands digit, and in the form of the 2-out-of-5 code. The following bistable devices $CG_{1/5}$, $TG_{1/5}$ and $UG_{1/5}$ are used in the same manner to respectively characterize the group, i.e. the hundreds digit, the tens digit and the units digit of the calling subscriber. The bistable devices $CHG_{1/7}$ characterize the time slot used by the calling subscriber and this in the form of a 3-out-of-7 code permitting 35 combinations of which 25 are used to characterize the various channels each of which have a duration of 4 microseconds in a system where the sampling period is of 100 microseconds. The groups of bistable elements SGD, GD, TD, UD, and CHD are used to staticize informations relative to the called subscriber, and they thus correspond respectively to the groups SGG, GG, TG, UG and CHG.

By providing a staticizing period which is at least equal to the sampling period of 100 microseconds, the informations will thus be stabilized in MST during a time which permits the transmission of these informations towards any slave control equipment such as SM during any time slot. In practice, one may choose a staticizing time of 120 microseconds which may be divided in 12 intervals each of 10 microseconds, these intervals being able to serve for various sequential logical operations. In this way, if the first 10 microseconds interval is reserved for the reading of a word from MM and for the stable storage of this word in MST, while the twelfth and last 10 microseconds interval is reserved to the reinscription of the word contained in MST into its position in the memory MM, there will remain ten logical operations which may be accomplished without any restriction on and from informations staticized in MST. In this manner it is seen that one may choose an operating frequency for the control logical operations which may be notably lower, for instance 100 kc./s., than the operating frequency used for the control of the electronic gates associated with the multiplex highways and which is thus for the example envisaged above of 250 kc./s. corresponding to a time channel of 4 microseconds.

When a word is staticized in MST in accordance with the sequence order established by SO, FIG. 1 shows that the informations characterizing the called subscriber can be effectively extracted from MST. When SO is in the condition of $SO_1$ operated, the electronic gates such as $G_{2/7}$ will be unblocked in such a way that signals will appear at their outputs which characterize the state of the corresponding bistable elements of MST, such as $SGG_3$ for gate $G_2$, etc. Assuming thus that it is desired to send informations staticized in MST and characterizing the calling subscriber towards the control equipment SM serving his multiplex highway, the coincidence gates such as $G_6$ and $G_7$ associated to the bistable elements $CHG_{1/7}$ will thus provide a combination of 7 binary signals, corresponding to the time slot of the calling subscriber in accordance with a 3-out-of-7 code, at the corresponding inputs of the mixer gates such as $M_1$ and $M_2$ respectively associated to the coincidence gates $G_6$ and $G_7$. The outputs of the 7 mixer gates are connected to a comparator device CMP which comprises another series of input terminals $P_{1/7}$.

Figure 5:
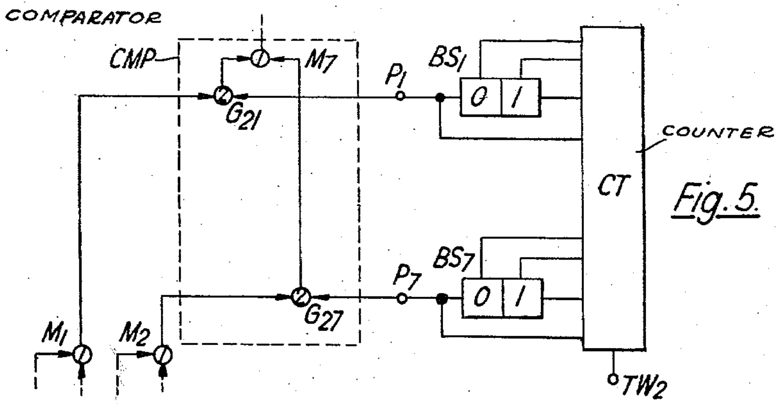
FIG. 5 shows a comparator device shown in FIG. 1, for translating a code identifying a time channel of a multiplex highway into a pulse occurring during this time channel.

FIG. 5 shows in more detail the comparator device CMP. To each of these terminals such as $P_1$ corresponds a coincidence gate such as $G_{21}$ whose other input is connected to the output of a corresponding mixer gate such as $M_1$ for terminal $P_1$. On the other hand, the various terminals $P_{1/7}$ are fed from the master pulse generator of the telephone exchange in such a way that potential combinations are successively established on the 7 terminals during the 25 successive time slots of each sampling period of 100 microseconds, the potentials characterizing the channel on the basis of a 3-out-of-7 code. Terminals $P_1$ to $P_7$ are fed from a counter device comprising 7 bistable elements $PS_{1/7}$ which are operated in such a way that for each channel time slot there is always 3 out of 7 bistable devices which are in a given state while the 4 other devices are in another state. The principle of such *m*-out-of-*n* counters has already been described in Belgian Patent No. 522,580 of M. Bataille 4 and the counter device of FIG. 5 and the counter device of FIG. 5 has not been represented in detail, only the bistable elements $BS_1$ and $BS_7$ being indicated with input wires connected to a long side of the rectangle symbolizing the bistable device and with output wires connected to the short sides. The bistables such as $BS_1$ and $BS_7$ are indicated as connected to block CT which symbolizes that part of the counter constituted by the interconnections between the various bistable devices $BS_{1/7}$. These interconnections will be established in accordance with a logical or truth table permitting to successively pass from one state to another and to characterize in this manner 25 states of which each corresponds to a predetermined time slot. To characterize the 25 channel time slots one will be able for instance to choose a 3-out-of-7 code which has a constant weight or at any rate which may be calculated in the form of a linear function of the weights pertaining to the seven ranks of the code. That is to say that this code of 3-out-of-7 may be of the same type as the 2-out-of-5 code well known under the designation 0-1-2-4-7 and which, by calculating the sum modullo 11 of any combination of 2 out of 5 weights permits to obtain all the digits from 0 to 9. For the 3-out-of-7 code permitting to obtain all the digits from 0 to 24, one will use the weights 0-1-2-3-6-11-20. The various sums of three weights are performed modulo 25, or else the digit 3 is subtracted from the different sums of three weights required.

Figures 6, 7:
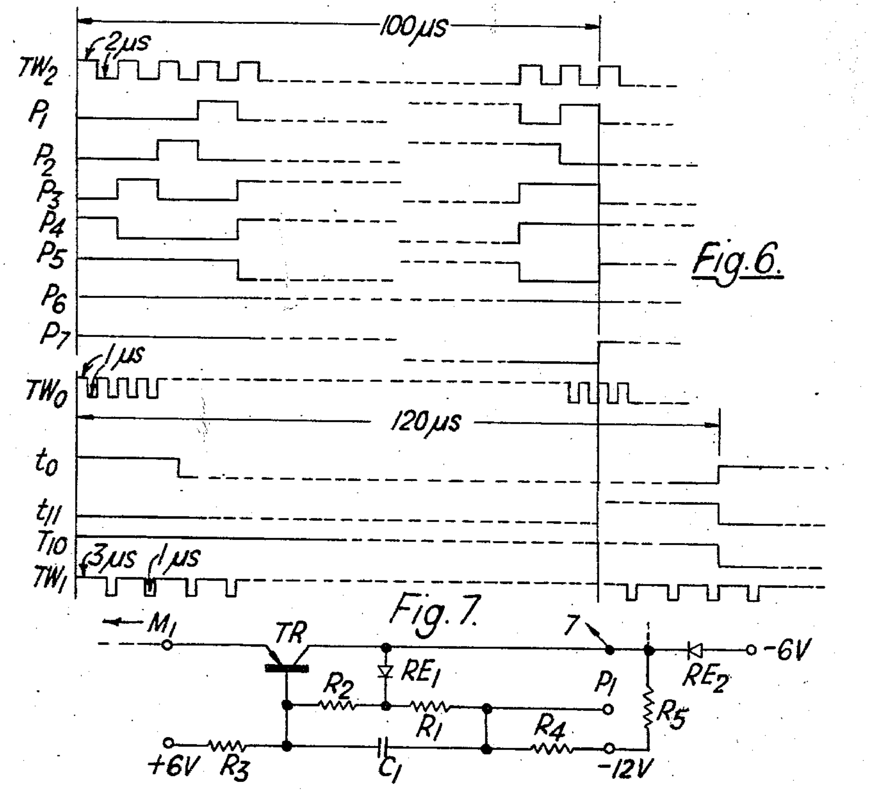
FIG. 6 shows various waveforms useful to establish the operation of the control system in accordance with the invention.
FIG. 7 shows a preferred embodiment of the comparator device represented as a logical circuit in FIG. 5.

FIG. 5 shows that the counter CT on the basis of 3-out-of-7, is provided with a terminal $TW_2$ which constitutes the input terminal of the counter and which is fed by a source of 250 kc./s. square pulses, i.e. the duration of each pulse is 2 microseconds while the period is 4 microseconds. The pulses $TW_2$ are represented in FIG. 6 and may be obtained by frequency division with the help of a scale-of-2 from the pulses $TW_0$ also represented in FIG. 6 and which are square pulses having a 500 kc./s. frequency and provided by the pilot pulse generator of the master pulse producing system.

These impulses $TW_0$ thus have a period of 2 microseconds and with the help of a counter of 5, they will be able to provide pulses (not shown) having a repetition period of 10 microseconds, pulses which may then be used to produce the series of 12 pulses $t_{0/11}$ already mentioned above, and which are used for logical operations during a staticizing time of 120 microseconds. These pulses $t_{0/11}$ are thus staggered with respect to one another within a period of 120 microseconds and they each have a duration of 10 microseconds, as shown for the pulses $t_0$ and $t_{11}$ in FIG. 6.

One of these pulses, e.g. $t_0$, having a repetition period of 120 microseconds, may then be used to feed a counter which will permit to identify as many time units of 120 microseconds as there are rows of words in the coordinate memory MM. For instance, if this memory MM comprises 1080 rows or words, this number being a function of the telephone exchange traffic, a counter of 1080 will be used so as to be able to characterize these 1080 time units of 120 microseconds. In practice this cycle of 1080 time units will be realized in several stages. One may first feed a counter of 9 by the pulses of 120 microseconds period such as $t_0$ in order to provide 9 series of pulses such as $T_{10}$ in FIG. 6 each having a duration of 120 microseconds, and a repetition period of 1.08 milliseconds. This counter of 9 may advantageously be realized with the help of a four-stage binary counter using an appropriate coupling to perform only a cycle of 9. Likewise, the pulses such as $T_{10}$ having a repetition period of 1.08 milliseconds, may with the help of a counter of 10 provide a series of 10 pulses each having a duration of 1.08 milliseconds and a repetition period of 10.8 milliseconds, the pulses being however staggered in time to define 10 consecutive time units in the cycle of 10.8 milliseconds. Finally, one of these pulses having a repetition period of 10.8 milliseconds may be used to feed a counter of 12 which will provide 12 series of pulses each having a duration of 10.8 milliseconds and a repetition period of 129.6 milliseconds, the pulses being staggered in time to define 12 time units of 10.8 milliseconds.

Just as the binary counters define time units by coincidences between the various states of the binary stages of the counter, it is evident that from the three pulse sets respectively defining 9 time units of 120 microseconds in a cycle of 1.08 milliseconds, 10 time units of 1.08 milliseconds in a cycle of 10.8 milliseconds and 12 time units of 10.8 milliseconds in a cycle of 129.6 milliseconds, it will be possible to define $9\times10\times12=1080$ time units of 120 microseconds in the total cycle of a 129.6 milliseconds, with the help of appropriate coincidence gates.

All pulses serving the control of the sequential access master memory MM as well as the channel pulses for the time division multiplex highways are thus obtained from the same pilot generator providing the pulses $TW_0$. The pulses $TW_2$ which have a period of 4 microseconds and which feed counter CT will thus be able to make the latter pass through 25 different successive states during a sampling cycle of 100 microseconds. Some of these states have been indicated in FIG. 6 by the rectangular waveforms appearing at terminals $P_{1/7}$. During the first time unit of 4 microseconds shown, terminals $P_{1/3}$ are at a low potential while terminals $P_{4/7}$ are at a high potential, which may correspond to code 1110000 by admitting that 1 corresponds to low potential. During the second time unit of 4 microseconds, as shown by FIG. 6, the code may be written 1101000, during the third time unit 1011000, etc.

While the states of the potentials at terminals $P_{1/7}$ continually pass from one combination to another every four microseconds, during a time at least equal to the sampling period of 100 microseconds, the potential combination appearing at the outputs of the mixer gates such as $M_1$ and $M_2$, or at the left-hand inputs of the corresponding coincidence gates of CMP, i.e. $G_{21}$ and $G_{27}$, will be stable. The combination will characterize one of the twenty-five channels and there will thus be lack of coincidence at all the seven gates $G_{21/27}$ only during a single time slot of 4 microseconds among the 25 time slots constituting the sampling period. It will be during this channel time only corresponding to the code registered in the elements $CHG_{1/7}$ of MST (FIG. 1) that none of the gates $G_{21/27}$ providing an output, the mixer gate $M_7$ which is driven by the outputs of all these coincidence gates, will also fail to provide an output signal, or at any rate the mixer gate $M_7$ will provide a pulse at the output of the comparator CMP during the channel time recorded in MST.

FIG. 7 represents a preferred embodiment of the comparator CMP which uses a single transistor per coincidence gate such as $G_{21}$. The output of this mixer gate $M_1$ constituting one of the left-hand inputs of comparator CMP is connected to the emitter of transistor TR which is of the PNP type, while the corresponding right-hand input terminal $P_1$ is connected to the base of this transistor with the help of a classical anti-saturation circuit comprising the two resistors $R_1$ and $R_2$ in series with their junction point connected to the transistor collector through rectifier $RE_1$ poled as shown, the two resistors $R_1$ and $R_2$ being shunted by condenser $C_1$, while the transistor base and terminal $P_1$ are respectively biassed by +6 and −12 v. potentials respectively through resistors $R_3$ and $R_4$.

The collector of the transistor TR constitutes the output terminal of the coincidence gate and as indicated by the multipling arrow marked with a 7, there will thus be 7 circuits identical to that described above with the collectors of all the transistors connected together, this common point constituting in fact the output terminal of the comparator, a particular mixer device being avoided. This common output point is connected to the potential source of −12 v. through resistor $R_5$ and also to a source of −6 v. by means of rectifier $RE_2$ in such a way that the output potential cannot become more negative than this last value. This output potential of −6 v. will solely be obtained upon all the 7 transistors TR being blocked, that is to say when there will be coincidence between the two codes to be compared, each providing a high potential towards the emitter and the base respectively of the associated transistor. But, as a code of the N-out-of-M type is considered, as long as there is lack of coincidence between the two codes to be compared, the emitter of at least one of the transistors is at the high potenial while on the other hand, the potential driving the base of this transistor from terminal $P_1$ is low. This will entail the conduction of the PNP transistor and consequently a high potential at the output of the comparator, blocking rectifier $RE_2$. The comparator will thus produce a negative pulse of 4 microsecs. upon coincidence between the two codes. However, if due to an error, the combination transmitted by the elements $CHG_{1/7}$ of MST (FIG. 1) towards the left-hand inputs of comparator CMP is incorrect, it might no longer constitute a 3-out-of-7 code. The comparator CMP could then provide several channel pulses of 4 microseconds at its output during a sampling period of 100 microseconds. Considering the circuit of FIG. 7 for instance, if the potential combination reaching the emitters of the 7 transistors TR is such that these 7 potentials are low, the transistors will remain blocked during the 25 channel time slots, with the result that 25 successive channel pulses of 4 microseconds will appear at the output of comparator CMP. If it can occur, such a fault is evidently particularly undesirable since as will be explained hereinafter in more detail, it would permit to send inforamtion to a given slave memory but instead of recording this information in the slave memory during the channel time slot corresponding to the opening of electronic gates at the input of the circuit considered, this same information would be recorded for all the 25 channel time slots with the result that the 25 corresponding circuits connected to the multiplex highway would all be multipled together.

Such a situation may be avoided with certainty by doubling the comparison equipment CMP, i.e. by providing the information from the elements $CHG_{1/7}$ which will in general be bistable flip-flops, under two forms: the normal form and the complementary form. In other words there will be two comparators such as CMP, one controlled by the pulses appearing at terminals $P_{1/7}$ and by the code in its normal form, but the other by the complementary pulses appearing at the 1-outputs of the bistables $BS_{1/7}$ and by the code in its complementary form, the two codes being issued from MST (FIG. 1). In this way, if an erroneous code having no longer three elements in a given state and four in the other can cause one of the two comparators to deliver an output pulse, the second comparator being forcedly driven by the complementary code is not able to deliver such an output pulse. Consequently, by bringing the outputs of the two comparators towards a coincidence gate, the latter will never be able to give an erroneous signal. Indeed, a code 1111111 which would activate during 100 microseconds the comparator output to which it is brought, would correspond to a code 0000000 which brought to the other comparator will never be able during any channel time slot to activate the output of this second comparator. It will only be upon the complete coincidence between the code provided by $CHG_{1/7}$ and that provided by the bistable flip-flops $BS_{1/7}$ that the two comparators will be simultaneously activated to provide a control pulse. Of course, if counter CT becomes faulty one can also prevent the sending of a pulse at the output of the comparator.

By referring again to FIG. 1, the channel pulse produced at the output of comparator CMP is switched towards the slave control equipment to which the information, and more particularly the identity of the calling subscriber line such as defined by the elements $TG_{1/5}$ and $UG_{1/5}$, must be transmitted. The identity of the slave control equipment such as SM corresponds to the identity of the multiplex highway serving the calling subscriber and defined by the elements $SGG_{1/5}$ and $GG_{1/5}$ identifying the supergroup in which is located the multiplex highway, and the highway number within this supergroup, or otherwise, the thousands and hundreds digits of the calling subscriber. The information defined by the elements $SGG_{1/5}$ and appearing at the outputs of mixer gates such as $M_3$ are materialized in the form of a 2-out-of-5 code and in order to facilitate the control of the gates such as $G_8$ forming the first stage of a switching device for the channel pulse produced at the output of comparator CMP, one may provide a decoding device DCS which is fed by 5 input wires on which the 2-out-of-5 code appears. This decoding device DCS translates this input code into an output code on a 1-out-of-10 basis, one of the ten output wires being represented as controlling the coincidence gate $G_8$. In this way, as indicated by the multipling arrow marked with a 10 at the output of the comparator CMP, the 4 microseconds pulse is switched in one direction out of ten in accordance with the thousands digit of the calling subscriber. Likewise, a second stage of coincidence gates such as $G_9$, among a total of 100 gates, will permit to finally switch the 4 microseconds pulse towards the desired slave equipment SM, this time under the control of the thousands digit as defined by the elements $CG_{1/5}$ which produce signals at the output of the mixer gates such as $M_4$ in accordance with a 2-out-of-5 code which will be translated by the decoder DCG in the same manner as previously described.

The output of gates such as $G_9$ thus feeds a particular slave-control equipment such as SM. Hence, it is seem that for any exchange there is in principle only 100 analogous wires on which may appear during each time unit of 120 microseconds, a channel pulse having a duration of 4 microseconds. The dotted line separating the circuit of FIG. 1 in two parts thus indicates that it is only for the upper part of the figure comprising these wires carrying control pulses at relatively high frequency that it is necessary to take the usual precautions such as screening. The remaining part of the equipment operates at a much lower frequency.

The information to be transmitted to the slave control equipment chosen by the gates $G_8$ and $G_9$ appears at the outputs of the mixer gates such as $M_5$ and $M_6$, i.e. on ten wires under the form of a 2-out-of-5 code for both the tens and the units digits. As indicated by the multipling arrows marked with 100, these wires are simply multipled towards the 100 slave control equipments such as SM and in each of these equipments, ten coincidence gates such as $G_{10}$ and $G_{11}$ are provided so as to allow the information characterizing the tens and units digits only upon the appearance of the channel pulse coming from gate $G_9$ and which is switched towards a particular slave control equipment SM.

It is clear that if on FIG. 1 the switching of the channel pulse towards 100 slave memories has been indicated as occurring in two stages, one may also forsee switching means permitting to steer the channel pulses towards other slave control equipments than those controlling the electronic gates giving access to the line circuits. The first switching stage will in principle be able to comprise supplementary directions going towards slave memory equipments such as those controlling the sending of the ringing signal towards the called subscriber as described in the H. Adelaar patent application No. 63,203 already cited. Likewise, it will also be possible to sent information towards the slave control equipment controlling the connection of a multiplex highway such as $GH_{10}$ in FIG. 2 towards one of the intermediate multiplex highways such as $IH_1$ or $IH_{12}$. In fact, this transmission of information for the control of connections between a subscriber multiplex highway and an intermediate multiplex highway may be simultaneously carried out with the sending of information characterizing the number of the calling subscriber within his group of 100. An analogous memory (not shown) to SM will be provided for the direct control of the connections of the multiplex subscriber highway towards the inside of the exchange and the wire at the output of $G_9$ will also control this second slave equipment located near the other end of the piece of coaxial cable constituting $GH_{10}$. In this manner, a particular gate will be unblocked at each end of $GH_{10}$ during a channel time.

This information characterizing the intermediate multiplex highway to which must be connected during predetermined channel time slots a multiplex highway serving a group of subscribers can be obtained from the bistable elements of the staticizing device MST. More particularly, if in accordance with the system suggested in the noted U.S. patent application No. 63,203 for a communication between two predetermined subscribers there is only a single intermediate multiplex highway which can intervene, its identity is automatically determined as it is clear from FIG. 2, by the identity of the supergroups to which the two subscribers pertain. Hence, during the transfer of the tens and units digits of the calling (called) subscriber towards the slave control equipment which controls the multiplex highway, it suffices to transmit at the same time the identity of the supergroup of the called (calling) subscriber to the slave control equipment on the exchange side of the highway in order that this equipment can also control the unblocking of the gate going towards the intermediate multiplex highway.

Figure 3:
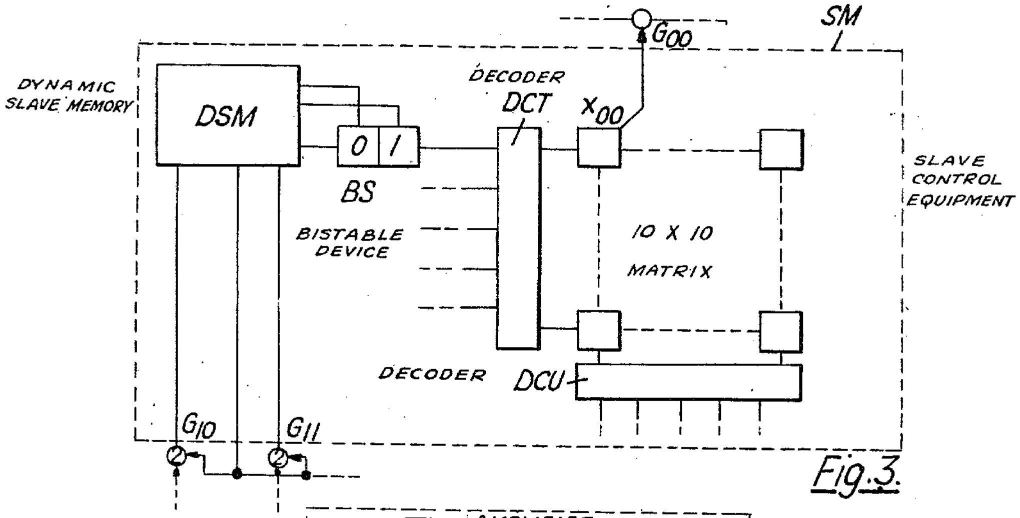
FIG. 3 shows a slave control equipment represented in a more detailed manner than shown in FIG. 1.

The slave control equipment such as SM including the input gates such as $G_{10}$ and $G_{11}$ may be realized as indicated in FIG. 3. The latter shows that the equipment SM can comprise a series of slave memories such as DSM to which are associated bistable flip-flops such as BS. There would be as many of these slave memories in each equipment SM as there are binary elements issued from MST and transmitted to this equipment, i.e. 10 in the case envisaged here of the transmission of the tens and units digits in the form of 2-out-of-5 codes.

As the memory MM of FIG. 1, the memories DSM of FIG. 3 are of the sequential access type, the information being staticized with the help of bistable device BS in the same manner as bistable devices have been foreseen for the realization of MST in FIG. 1. However, the speed of circulation in the slave memories being distinctly higher than that of the master memory, it is advantageous to realize these slave memories in the form of dynamic or circulation memories, which are essentially constituted by delay devices in which binary information continually circulates. In such memories, the information is thus dynamically recorded and it is not necessary to foresee an access switch. A staticizing device such as BS is still necessary however to staticize each circulating pulse toward the outside circuits during the corresponding channel time of 4 microseconds.

Figure 4:
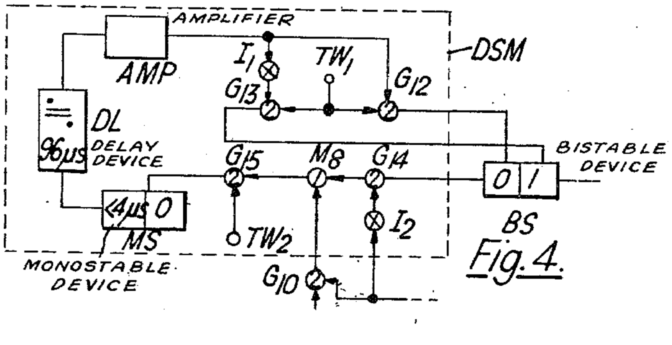
FIG. 4 shows a slave memory system shown in FIG. 3.

FIG. 4 represents the essential elements of a dynamic memory such as DSM. The latter is essentially constituted by a delay device DL which will preferably be a magnetostriction delay line whose delay is adjusted around 96 microseconds. In this delay line circulate eventual pulses separated by intervals of 4 microseconds. The pulses appearing at the output of DL are amplified by amplifier AMP and are applied on the one hand to coincidence gate $G_{12}$ and on the other hand to coincidence gate $G_{13}$ by means of the inverter $I_1$. These two gates $G_{12}$ and $G_{13}$ are controlled by pulses $TW_1$ which are negative pulses of 250 kc./s. represented in FIG. 6 as having a negative polarity duration of the order of 1 microsecond for a 4 microsecond period. Each of these strobe pulses $TW_1$ succeeding one another at a rhythm of 250 kc./s. will thus be able to pass either to the output of gate $G_{12}$ or to the output of gate $G_{13}$ according to whether amplifier AMP has provided a pulse or not. In the first case, the bistable device BS will be brought into its zero condition by this strobe pulse and more particularly by the positive edge corresponding with the start of a channel time, while in the second case it will be brought into its one condition. When BS is thus in its zero condition, it activates an input of the coincidence gate $G_{14}$ whose other input is controlled by the channel pulse issued by the comparator CMP (FIG. 1) by means of an inverter device $I_2$. In this way, as long as a channel pulse coming from comparator CMP is not steered to the slave memory considered, gate $G_{14}$ is unblocked and if the zero output of BS has been activated by the receipt of a pulse coming from the output of DL, a 4 microseconds pulse will thus appear at the output of $G_{14}$ to reach one of the inputs of coincidence gate $G_{15}$ though mixer gate $M_8$. The second input of gate $G_{15}$ is controlled by the pulses $TW_2$ shown in FIG. 6 and having also a frequency of 250 kc./s. If a 4 microseconds pulse reaches gate $G_{15}$ originating from mixer gate $M_8$, pulse $TW_2$ will thus pass through $G_{15}$ to trigger a monostable device MS out of its stable condition. This monostable device will produce a pulse whose duration is lower than a channel time of 4 microseconds, after which it returns to its stable state. It may be realized preferably with the help of a blocking oscillator whose output transformer is coupled to the input of the magnetostriction delay line DL. The positive edge of $TW_2$ will be used to trigger MS, this positive edge corresponding with the start of a channel time. In this manner, if DL provides a delay of the order of 96 microseconds, on condition that the pulse travelling on the delay line and generated at the start of a channel time reaches the output of DL at the beginning of the preceding channel time in the cycle, or in any event that the start of the preceding channel time in the cycle and coinciding with the positive edge of $TW_1$ coincides with the pulse produced by amplifier AMP, this pulse will be regenerated in its own channel time, the positive edge of $TW_2$ being only able to trigger MS after the triggering of BS back to its zero condition. In other words, the effective $TW_2$ pulse is that which is lagging by a channel time with respect to the $TW_1$ pulse having driven BS.

On the other hand, if new information must be inscribed in DSM originating with the master control equipment, the 4 microseconds pulse provided by the output of comparator CMP will reach gate $G_{12}$ of the circulating memory DSM considered and in accordance with the binary signal present at the other input of $G_{10}$ a 4 microseconds pulse will appear at the output of this gate $G_{10}$ or not and by passing through the mixer gate $M_8$ it will authorize or not the access of a $TW_2$ pulse to the monostable device MS in the same manner as previously described. In this case of course, the 4 microseconds channel pulse will block $G_{14}$ by means of the inverter device $I_2$ in such a way that the information so far circulating in DL during the channel time considered, will be eliminated to be replaced by the new information transmitted by gate $G_{10}$.

The information originating with MST and corresponding to the lower input of the gates such as $G_{10}$, stays there for a duration of 110 microseconds, as appropriate measures will be taken to avoid bringing information to $G_{10}$ during the time $t_0$ of 10 microseconds which corresponds to the reading from the master memory MM, time during which the information is being established in the bistable device such as $TG_3$ part of the staticizing device MST. As indicated in FIG. 6, the end of the pulse of 110 microseconds coincides with the end of the $t_{11}$ pulse or the beginning of the $t_0$ pulse; it is thus in coincidence with a transition between two channels, the staticizing period of 120 microseconds being an integral multiple of the 4 microseconds channel time.

The five circulating memories DSM used to identify the tens digit of the calling subscriber in each of the 25 channels of a multiplex highway, control with the help of their five bistable devices such as DS a decoding circuit DCT which will translate during each four microseconds time channel the state of these flip-flops forming a combination of 2-out-of-5 into a code of 1-out-of-10 materialized by the appearance of an activating signal on one output wire out of ten from the decoder DCT. An analogous decoder DCU is used in relation with the five circulating memories embodying the units digit of the calling subscribers in the form of a 2-out-of-5 code. The 10 outputs from DCT and the 10 outputs of DCU are then used to control a matrix of $10 \times 10 = 100$ crosspoint circuits such as $X_{00}$. During each channel time there will thus be one of these crosspoint circuits such as $X_{00}$ among the 100 circuits which will be activated by the coincidence of the signals originating from DCT and DCU and which will thus identify the number of the calling line on this channel inside a group of a 100 lines. The signal produced by circuit $X_{00}$ is used to control the unblocking of gate $G_{00}$ corresponding to this calling subscriber.

Though the invention has been described above by referring to a particular system described in the U.S. patent application issued to H. Adelaar, Serial No. 63,203, filed October 17, 1960, it is quite evident that this invention is also applicable to other communication systems using time division multiplexing. In particular, the invention will also be applicable to systems where due to the smaller number of subscriber's circuits, intermediate multiplex highways are no longer necessary.

Particularly, in the case of a telecommunication system where the number of subscribers is not too large, e.g. a telephone exchange of 1000 lines, the system of the present invention will be very advantageous since a single master control equipment will be able to simultaneously serve for the recording of words having different functions, e.g. a register control function or a supervision function. The same column of the coordinate memory will then be able to serve to the storage of either register information or of supervision information, one or more columns being reserved to establish the function of the others, e.g. either register or supervision. In this way, the economy is appreciable since there is only one common memory and also because its recording capacity and more particularly the number of binary digits of each word is practically determined by the highest number of digits necessitated either by the supervision or by the register equipment.

While the principles of the invention have been described above in connection with specific apparatus, it is to be clearly understood that this description is made only by way of example and not as a limitation on the scope of the invention.

We claim:

1. A time division multiplex telephone system comprising a plurality of line circuits, a plurality of time division multiplex hghways having associated gate means for individually interconnecting said highways with successive ones of said line circuits during sample periods in sequentially recurring time slots, thereby establishing communication between selected ones of said line circuits during discrete time slots carried by said highways, means comprising a slave control equipment associated with each of said highways for memorizing the time slots during which particular gates associated with said highways are unblocked, common equipment comprising master memory means associated with a plurality of said slave control equipments for reading and recording line-connection information stored in said slave equipments to control the establishment, routing and release of calls over said highways, means for driving said master memory means through a cycle of operation at a speed such that said master memory means exercises control over said slave equipment by offering control signals to said slave equipments during time intervals which are at least equal to the duration of said sample periods.

2. A time-division multiplex telecommunication system as set forth in claim 1 wherein said common equipment includes staticizing means for storing the said line-connection information from each said multiplex highways during each corresponding scanning interval of the corresponding line and multiplex highway, and means for modifying said stored information responsive to the termination of the last said scanning interval.

3. A time-division multiplex telecommunication system as set forth in claim 2 wherein the said scanning interval is a multiple of the scanning period of said time slots divided by the number of channels on any of said multiplex highways.

4. A time-division multiplex system as set forth in claim 3 wherein the said line-connection information includes channel identifying codes and wherein counter means is provided having a number of positions corresponding to the number of channels on any multiplex highway and operable through all said positions during each scanning period, comparator means for comparing the channel identifying code with said counter positions and for transferring information from said master control equipment to said individual control equipment at each coincidence period of said channel identifying code and said counter position.

5. A time-division multiplex system as set forth in claim 4, normally open connecting means extending between said master control equipment and said slave control equipment, means for transmitting information from said master control equipment to all of said connecting means, and gating means controlled by each said coincidence of channel identifying code and counter position for completing a connection from said master control equipment over the connecting means associated with the individual control equipment serving the channel corresponding to the channel identifying code.

References Cited by the Examiner

UNITED STATES PATENTS

| | | | |
|---|---|---|---|
| 2,917,583 | 12/59 | Burton | 179—15 |
| 2,968,696 | 1/61 | Trousdale | 179—15 |
| 3,029,311 | 4/62 | Ward | 179—15 |
| 3,042,751 | 7/62 | Graham | 179—15 |

DAVID G. REDINBAUGH, *Primary Examiner.*

WALTER L. LYNDE, *Examiner.*